United States Patent
Wehler

(10) Patent No.: US 6,708,480 B1
(45) Date of Patent: Mar. 23, 2004

(54) LINE AND METHOD FOR PRODUCING A FIBER REINFORCED LINE OF A WIRING ARRANGEMENT

(75) Inventor: Herbert Wehler, Neunkirchen (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 10/149,275
(22) PCT Filed: Nov. 23, 2000
(86) PCT No.: PCT/EP00/11683
§ 371 (c)(1), (2), (4) Date: Sep. 13, 2002
(87) PCT Pub. No.: WO01/48885
PCT Pub. Date: Jul. 5, 2001

(30) Foreign Application Priority Data

Dec. 23, 1999 (DE) ........................ 199 62 8297

(51) Int. Cl.⁷ .............................................. F16G 13/00
(52) U.S. Cl. ................................. 59/78.1; 248/49
(58) Field of Search ........................ 59/78.1; 248/49, 248/51

(56) References Cited

U.S. PATENT DOCUMENTS 5,134,251 A * 7/1992 Martin ...................... 59/78.1
5,836,148 A * 11/1998 Fukao ........................ 59/78.1
6,161,373 A * 12/2000 Heidrich et al. ............ 59/78.1
6,367,238 B1 * 4/2002 Fischer ...................... 59/78.1
6,459,037 B2 * 10/2002 Muller et al. ............... 59/78.1
6,516,602 B2 * 2/2003 Sakai et al. ................. 59/78.1

FOREIGN PATENT DOCUMENTS

| DE | 1 131 480 | 2/1961 |
| DE | 44 26 598 C1 | 7/1994 |
| DE | 197 52 377 A1 | 11/1997 |
| EP | 0 490 022 A2 | 4/1991 |
| EP | 0 544 027 A1 | 11/1991 |
| EP | WO 01/48885 A1 | 7/2001 |

* cited by examiner

Primary Examiner—David B. Jones
(74) Attorney, Agent, or Firm—Smith Moore LLP

(57) ABSTRACT

For a line guide arrangement, a strand (1) of plastic is proposed, which comprises flexibly joined segments (2). The segments (2) are bounded by transverse separations (4) crosswise to the longitudinal direction of the strand (1). The transverse separations (4) extend to the vicinity of a support wall portion (5). The strand (1) includes at least one reinforcement fiber (6), which extends substantially parallel to the direction of the strand, and which is arranged substantially in the support wall portion (5), with at least one reinforcement fiber (6) being provided before or after forming the segments (2).

14 Claims, 5 Drawing Sheets

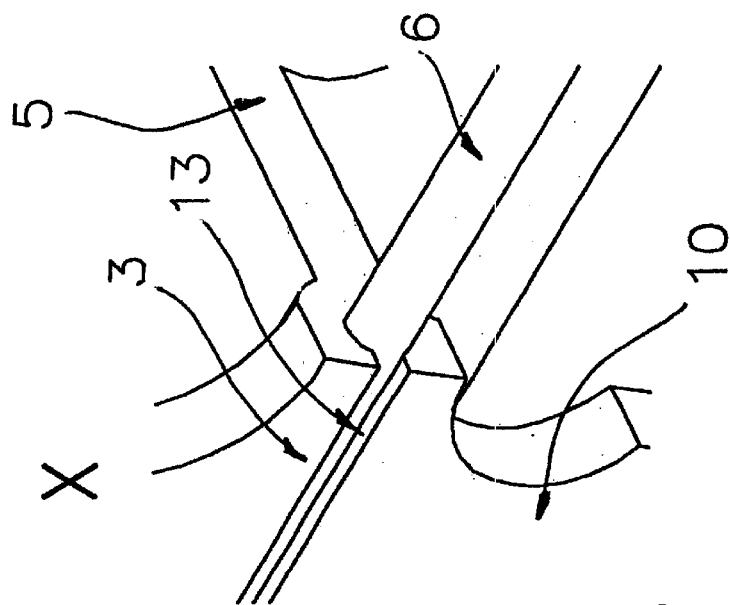
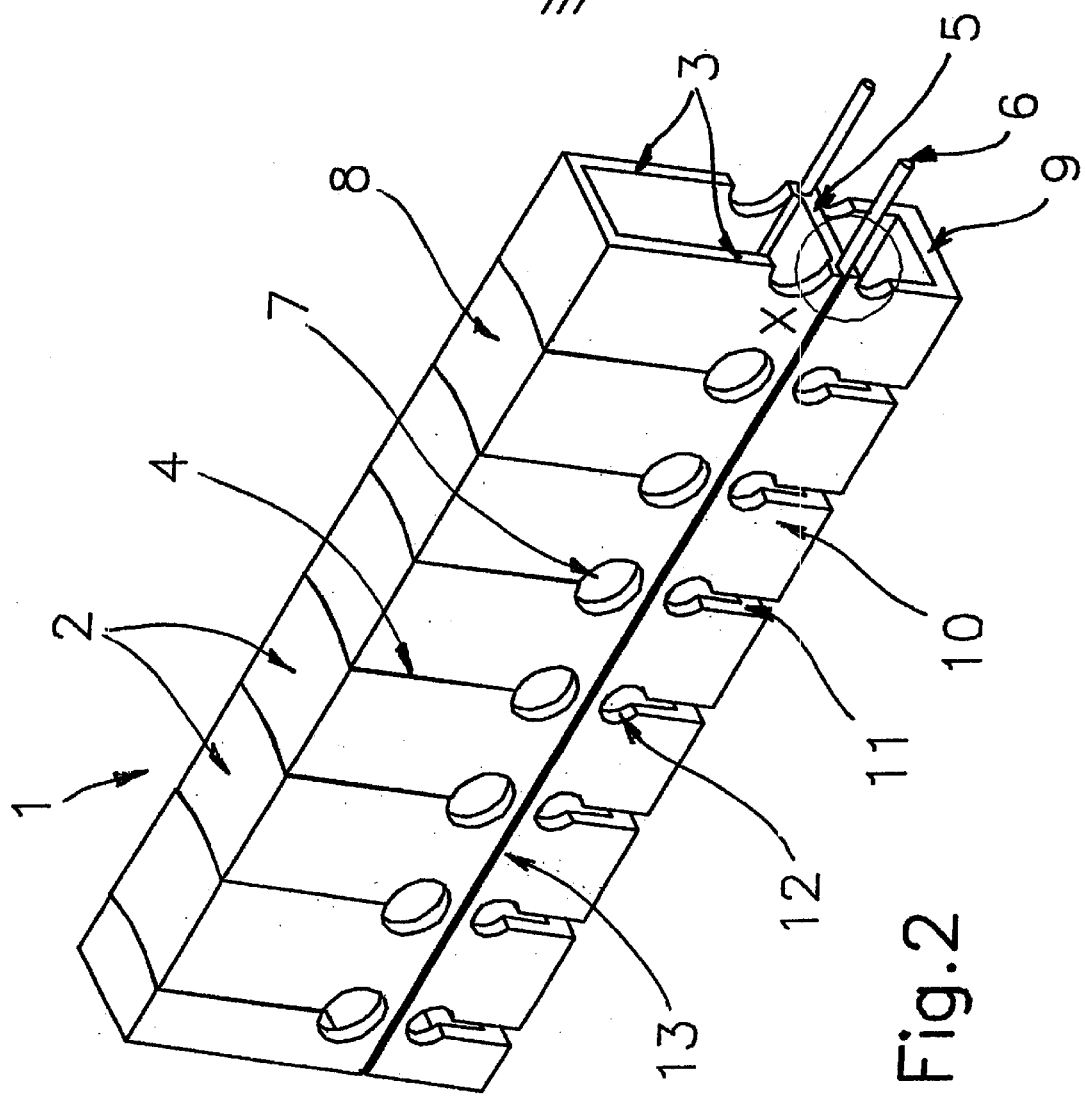

LINE AND METHOD FOR PRODUCING A FIBER REINFORCED LINE OF A WIRING ARRANGEMENT

BACKGROUND OF THE INVENTION

Field of the Invention

The subject matter of the invention relates to strand of plastic and a line guide arrangement for running at least one line as well as a method of making a strand.

Line guide arrangements are used for running lines from a stationary connection to a movable consumer. Known are line guide arrangements, which comprise flexibly joined segments. Each segment includes side wall portions. The segments are formed by transverse separations of a strand. The transverse separations extend crosswise to the longitudinal direction of the strand. They are formed at selected distances from one another. In the side wall portions, the separations extend to the vicinity of a support wall portion. The strands enable a looping of the line guide arrangement. Such a configuration of a strand is disclosed in EP 0 544 027 A1.

Furthermore, EP 0 490 022 A1 discloses strands for a line guide arrangement. These strands are in part formed as special-section strands. The special-section strand comprises a support wall portion projecting substantially crosswise to a side wall portion, with transverse separations continuing through the side wall portion at least to the vicinity of the support wall portion. Thus-formed strands of plastic for a line guide arrangement are extruded from the plastic. The transverse separations are mechanically formed.

The strands of a line guide arrangement are subjected to a bending stress, when they form loops. This stress is dependent on the radius of curvature, which is realized, when the line guide arrangement is looped. Preferred are small radii of curvature, so as to limit the line guide arrangement to a small overall space.

These bending stresses repeatedly act upon the support wall portion, and may lead in the case of relatively rigid special-section strands to cracks in the material of the support wall portion. These cracks considerably influence the service life of the line guide arrangement.

SUMMARY OF THE INVENTION

Based on the foregoing, it is an object of the present invention to further develop the known strand as well as a line guide arrangement such that an increased service life is attained. A further object of the present invention is to describe a method of making a strand with an increased alternating bending strength.

According to the invention, these objects are accomplished by a strand of a line guide arrangement having the characteristic features of claim 1 and a method of making the strand comprising the steps of claim 11, 13, or 14. Advantageous further developments and improvements of the invention are subject matter of the dependent claims.

The strand of plastic for a line guide arrangement according to the invention possesses flexibly interconnected segments, which have side wall portions along the direction of the strand. These side wall portions are defined by transverse separations formed crosswise to the longitudinal direction of the strand, which extend at selected distances from one another to the vicinity of a support wall portion. The strand possesses at least in part at least one reinforcement fiber. The reinforcement fiber extends substantially parallel to the direction of the strand, and it is arranged substantially in the support wall portion. The use of at least one reinforcement fiber of this kind reduces an expansion of cracks in the support wall portion in case of frequent bending stresses, and thus raises the load cycle of the strand, thereby increasing its service life. It is preferred to arrange the reinforcement fiber substantially along the neutral axis of the strand. The neutral axis extends inside the support wall portion. In this way, the reinforcement fiber is subjected to little mechanical stress.

For further increasing the alternating bending strength of the strand, and thus likewise of the line guide arrangement, it is proposed to extend the reinforcement fiber at least over the entire length of the strand. In this manner, it is ensured that all segments of the strand perform similarly over a certain load cycle of the bending stresses.

According to a yet further advantageous embodiment of the strand for a line guide arrangement, it is proposed to extend the reinforcement fiber beyond the strand. The portions of the reinforcement fiber, which project on the face end beyond the length of the strand, serve as a point of attachment or connection. In this manner, the portions of the reinforcement fiber projecting from the strand may be connected to a further strand. Furthermore, these projecting portions of the reinforcement fiber may be connected to a wall mounting part. It will be especially advantageous to clamp the projecting portions of the reinforcement fiber with a connector, which reduces or prevents a movement of the reinforcement fiber relative to the strand. This accomplishes an absorption or transmission of tensile forces that occur from the strand to the reinforcement fiber.

According to a yet further advantageous embodiment, the reinforcement fiber extends on the support wall portion. Accordingly, the reinforcement fiber is arranged such that it enables a relative movement between the reinforcement fiber and the support wall portion. This presents the possibility of being able to mount the reinforcement fiber in a simple and detachable manner to the support wall portion.

Preferred is the embodiment of a strand, wherein the reinforcement fiber is attached at least in part to the support wall portion. This prevents a relative movement between the strand and the reinforcement fiber. A thus-realized attachment prevents signs of wear of the connection fiber and/or the strand, as result from the relative movement to each other and from the resultant friction on the surfaces.

Preferably, the reinforcement fiber is arranged such that it is surrounded at least in part by the material of the support wall portion. The construction of a device for applying the reinforcement fiber may thus be integrated into the production process of the strand, and further joining processes may be omitted.

According to a yet further advantageous embodiment of the strand, the reinforcement fiber exhibits a higher alternating bending strength and/or tensile strength than the support wall portion. A higher alternating bending strength and/or tensile strength of the reinforcement fiber in the support wall portion reduces the speed of the crack expansion, and clearly increases the attainable load cycle under bending stress. An increased alternating bending strength and/or tensile strength of the reinforcement fiber over the support wall portion may be accomplished with a material of the reinforcement fiber, which differs from the material of the support wall portion and/or a suitable constructional design of the reinforcement fiber.

It is preferred to make the reinforcement fiber as a steel wire. Based on its alternating bending strength and tensile strength characteristics, the steel wire increases the attainable load cycle under alternating bending stress. In comparison with other cross sectional profiles, a preferred, circular cross section of the steel wire reduces a development of cracks in the case of bending stress in the vicinity of the reinforcement fiber. The mechanical properties of the steel wire assist an easy loop formation of the line guide arrangement, in that the steel wire adapts itself to the required radius of curvature. According to further embodiments, the reinforcement fiber is formed at least in part from fiberglass, carbon fiber, KEVLAR® fiber, or textile fiber. KEVLAR® is a registered trademark of E. I. duPont de Nemours Company Corporation.

A yet further advantageous design of a strand for a line guide arrangement distinguishes itself in that the strand comprises a plurality of reinforcement fibers in the support wall portion, which extend preferably symmetrically to the side wall portion. This will be especially important, when the strand is designed and constructed as a special-section strand. The arrangement of a plurality of reinforcement fibers in the support wall portion substantially in symmetry to the side wall portion, enables a more even load distribution in the support wall portion.

According to a yet further concept of the invention, a line guide arrangement is proposed, wherein at least two, substantially parallel strands are interconnected with cross members, which are attached to opposite segments at selected distances from each other. In this instance, the segments and cross members define a guide channel for running at least one line. The parallel arrangement of the strands ensures that a line guide arrangement is present with a constant width. The cross members, which are attached to opposite segments, increase the torsional rigidity of the line guide arrangement. Thus, the increased alternating bending capability of the strands enables an increased service life of the line guide arrangement. The line guide arrangement may be designed and constructed according to the line guide arrangements disclosed in DE 19 839 966.9 and/or DE 19 840 012.8 and/or DE 19 837 231.0. The disclosure of these applications also forms the subject matter of the present application.

The method of the invention for making a strand of plastic for a line guide arrangement that comprises flexibly joined segments, which include side wall portions along the direction of the strand, and whose boundaries are transverse separations that are formed crosswise to the longitudinal direction of the strand, with the separations extending at selected distances from one another to the vicinity of a support wall portion, wherein the strand is extruded and the segments are formed, is characterized in that before or after forming the segments, at least one reinforcement fiber is provided substantially on the support wall portion and substantially parallel to the direction of the strand. Irrespective of the time, when the segments are formed, the at least one reinforcement fiber is provided on the support wall portion. To this end, additional joining methods and/or necessary devices may be used.

According to an advantageous variant of the method of making a strand of a line guide arrangement, it is proposed to form in the support wall portion preferably a longitudinal groove, and to insert into same the reinforcement fiber. The longitudinal groove makes it possible to run the reinforcement fiber on the support wall portion. In accordance with the shape of the longitudinal groove, it is possible to restrict the freedom of movement of the connection fiber. In addition, there exists the possibility of joining the reinforcement fiber to the support wall portion in the vicinity of the groove by means of further joining methods such that no relative movement is possible between the reinforcement fiber and the support wall portion.

A further advantageous concept proposes a method of making a plastic strand of a line guide arrangement, with the strand comprising flexibly joined segments, which include side wall portions along the direction of the strand, and whose boundaries are transverse separations formed crosswise to the longitudinal direction of the strand, the separations extending at selected distances from one another to the vicinity of a support wall portion, wherein the strand is extruded and the segments are formed, and wherein the at least one reinforcement fiber is inserted into the extrusion die during the process before the extrusion step. In so doing, the reinforcement fiber is positioned in the extrusion die such that it is arranged in or on the support wall portion after the curing process of the plastic. Thus, the attachment of the reinforcement fiber to the strand is integrated into the formation of the strand.

BRIEF DESCRIPTION OF THE DRAWINGS

Further details and advantages of the plastic strand of a line guide arrangement are described in greater detail with reference to the embodiments illustrated in the drawing, in which:

FIG. 2 is a perspective view of a further embodiment of a strand for a line guide arrangement;

FIG. 3 is a detail view of the embodiment of FIG. 2;

DESCRIPTION OF THE PREFERRED EMBODIMENT

Figure 1:
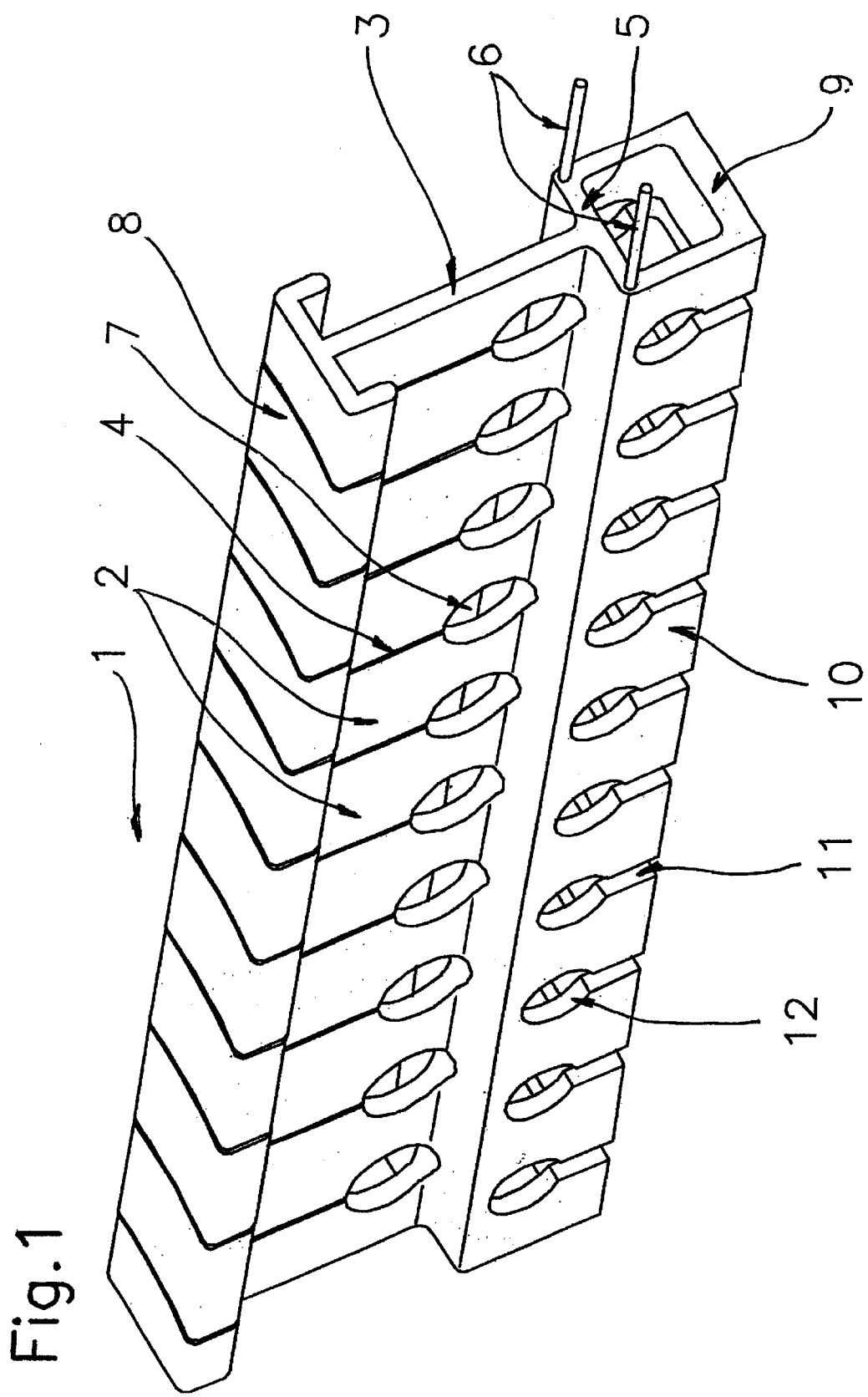
FIG. 1 is a schematic and perspective view of an embodiment of a strand for a line guide arrangement.

FIG. 1 illustrates a strand for a line guide arrangement. For the sake of clarity the line guide arrangement as such is not shown in FIG. 1.

A strand 1 of plastic comprises flexibly joined segments 2, which include side wall portions 3 extending along the direction of the strand. The segments 2 are separated from one another by transverse separations 4.

In the illustrated embodiment, the strand 1 is designed and constructed at least in part as a hollow-section strand. The hollow-section strand comprises a support wall portion 5 and a bottom wall portion 9. The support wall portion 5 and bottom wall portion 9 are connected to each other by two, substantially parallel extending side walls 10. In the illustrated embodiment, the hollow-section strand 1 is made substantially rectangular. The side wall portion 3 is formed on the support wall portion 5 substantially in the center thereof. On the opposite side of the hollow section, the side wall portion 3 comprises a cover wall portion 8. Same is arranged on the side portion 3 in the center thereof, and designed and constructed as a special-section strand. The cover wall portion 8 comprises two edge portions formed substantially parallel to the direction of the strand. The cover wall portion 8 is C-shaped. The at least partial construction of strand 1 as a hollow-section and special-section strand imparts to a line guide arrangement an increased strength and torsional rigidity.

The transverse separations 4 are arranged at selected distances from one another, and they extend through the cover wall portion 8 and continue into the side wall portion 3 to at least the vicinity of the support wall portion 5. The transverse separations 4 widen to cutouts 7 with a substantially circular cross section. The circular cutouts 7 reduce stress in the region of the bending axes.

The strand 1 comprises cutouts 11, which extend through the bottom wall portion 9. The cutouts 11 continue into the side wall 10 to the vicinity of support wall portion 5. The cutouts 11 widen to enlargements 12 with a substantially circular cross section. The width of cutouts 11 determines the angle of traverse of adjacent segments 2. The angle of traverse of adjacent segments 2 also defines the radius of curvature of strand 1. Thus, the strand 1 is designed and constructed with integrated limiters of the radius of curvature.

As shown in FIG. 1, the strand 1 possesses preferably two reinforcement fibers 6, which extend substantially parallel to the direction of the strand, and which are arranged substantially in the support wall portion 5. The reinforcement fibers 6 serve to transmit tensile forces, and they increase the alternating bending strength of strand 1.

In the illustrated embodiment, the reinforcement fiber 6 extends over the entire length of strand 1. The reinforcement fibers 6 are formed without a gap over the length of the strand, and they ensure absorption of tensile forces. To provide a possibility of attachment or connection, the reinforcement fibers 6 project. These projecting portions of the reinforcement fibers 6 permit attachment of the strand 1 to a wall mounting part, or they ensure a connection to adjacent strands 1.

Over the entire length of strand 1, the reinforcement fiber extends such that it is surrounded by the material of support wall portion 5.

Preferably, the reinforcement fiber 6 is made as a steel wire. In the illustrated embodiment, the alternating bending strength and tensile strength characteristics of the steel wire increase the alternating bending strength of strand 1.

The reinforcement fibers 6 are arranged substantially in symmetry to the side wall portion 3 in the vicinity of the abutting ends of support wall portion 5 and side wall 10. This region is very highly stressed, and it is to be considered as a preferred region for an expansion of cracks in the case of bending stress. The arrangement of reinforcement fiber 6 in this region enables a clear increase in the alternating bending strength of strand 1. The symmetric arrangement with respect to side wall portion 3 ensures a symmetric stress in the cross section of support wall portion 5.

The strand 1 of the illustrated embodiment is made of plastic and extruded. Before the extrusion step, the steel wire is positioned in the extrusion die such that it will be located in the described region of support wall portion 5. Subsequently, the segments are formed.

FIG. 2 illustrates a further embodiment of a strand 1 of a line guide arrangement.

The strand 1 comprises flexibly joined segments 2, which include two side wall portions 3 each extending along the direction of the strand. The segments 2 are separated from one another by transverse separations 4.

The illustrated strand 1 is designed and constructed as a hollow-section strand. The hollow-section strand comprises a cover wall portion 8 and a bottom wall portion 9. A support wall portion 5 extends substantially parallel between the cover wall portion 8 and bottom wall portion 9, and subdivides the hollow section. In the hollow section, lines may be run. The strand may also be used for constructing a line guide arrangement, such as is illustrated, for example, in FIG. 6. The cover wall portion 8 and support wall portion 5 are interconnected by two, substantially parallel extending side wall portions 3. Furthermore, in a plane, in which each side wall portion 3 extends, a side wall 10 is arranged, which interconnects support wall portion 5 and bottom wall portion 9. Thus, in the illustrated embodiment, the strand 1 comprises two hollow sections, which are made rectangular. The side walls 10 of strand 1 are defined by cutouts 11 and enlargements 12. The cutouts 11 extend through bottom wall portion 9. Between each side wall portion 3 and side wall 10 of a segment 2, a reinforcement fiber 6 is arranged in support wall portion 5. This embodiment distinguishes itself by a particularly satisfactory torsional rigidity. The arrangement of reinforcement fiber 6 is described in the following with reference to FIG. 3.

FIG. 3 is a detail view of a strand 1 of plastic for a line guide arrangement as shown in FIG. 2. In this embodiment, the two reinforcement fibers 6 are surrounded only in part by the material of support wall portion 5. Consequently, the strand 1 comprises a groove 13, which spaces side wall portion 3 from side wall 10. An arrangement of reinforcement fiber 6 on strand 1 in the illustrated manner is especially important with respect to retrofitting known strands 1 of a line guide arrangement.

Figure 4:
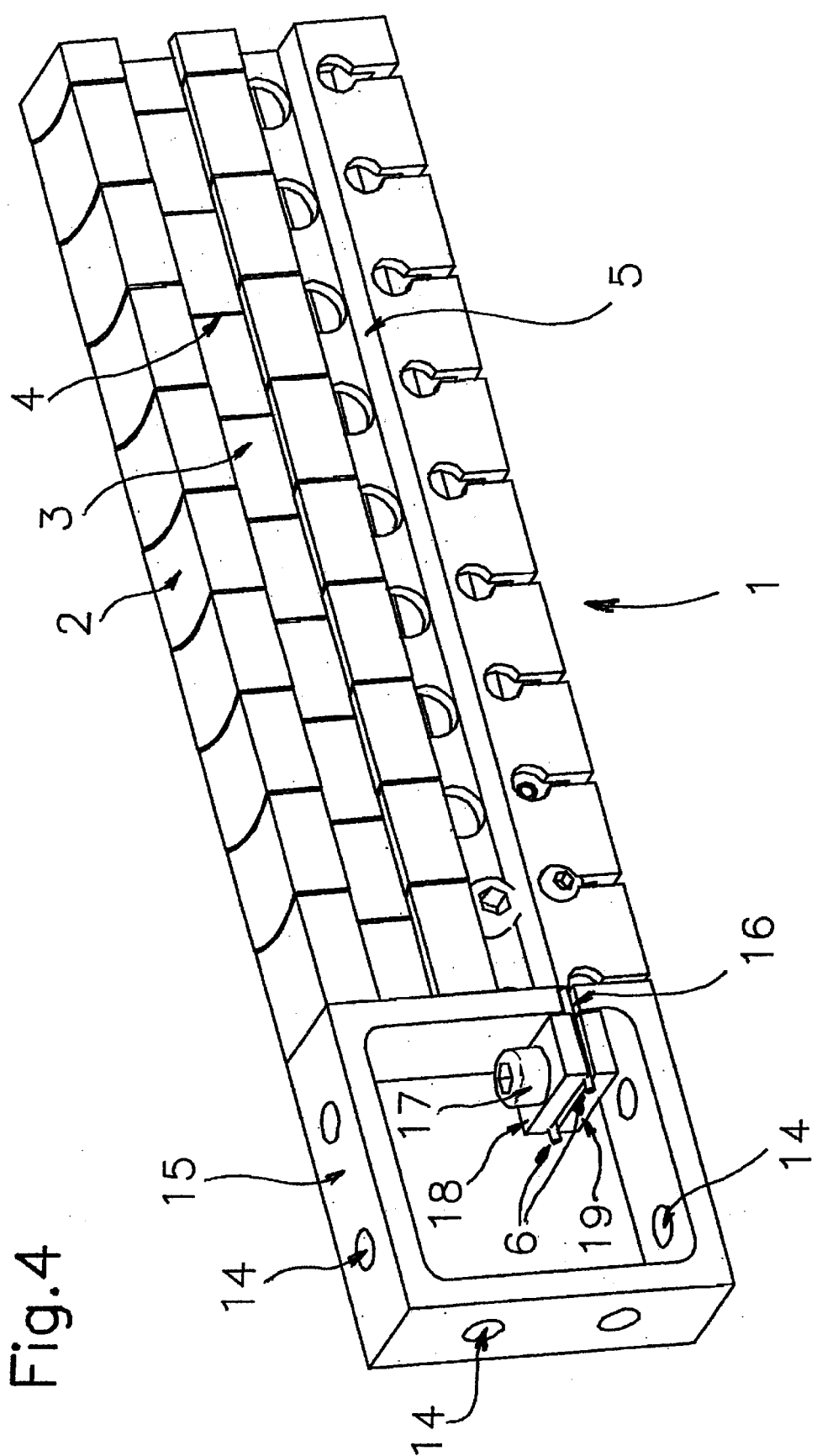
FIG. 4 illustrates a yet further embodiment of a strand for a line guide arrangement with a clamped-in reinforcement fiber.

FIG. 4 illustrates a yet further embodiment of a strand 1 for a line guide arrangement. The segments 2 comprise side wall portions 3 along the direction of the strand. These side wall portions are designed and constructed as tee-sections. The segments 2 are separated from one another by transverse separations 4. The support wall portion 5 accommodates two reinforcement fibers 6 substantially parallel to the direction of the strand. The reinforcement fibers 6 project from strand 1.

The embodiment shown in FIG. 4 comprises a connector 15, which adjoins strand 1 in the direction of the strand. This connector 15 comprises two grooves 16, in which the projecting portions of reinforcement fibers 6 are arranged. The connector is designed and constructed as a rectangular hollow section perpendicular to the direction of the strand. The connector comprises in addition connection bores 14, which serve as a possibility of attachment or connection to a contact or bearing surface not shown.

The projecting portions of the reinforcement fibers 6 extending in groove 16 are clamped in the interior of the hollow section of connector 15 between an upper plate 18 and a lower plate 19. The force necessary for clamping reinforcement fibers 6 between upper plate 18 and lower plate 19 is produced by a fastening means 17. In the embodiment illustrated in FIG. 4, the fastening means 17 is realized as a screw connection. Upper plate 18 and lower plate 19 lie against the connector 15. In this manner, tensile forces occurring in the strand are transmitted to the reinforcement fibers 6.

Figure 5:
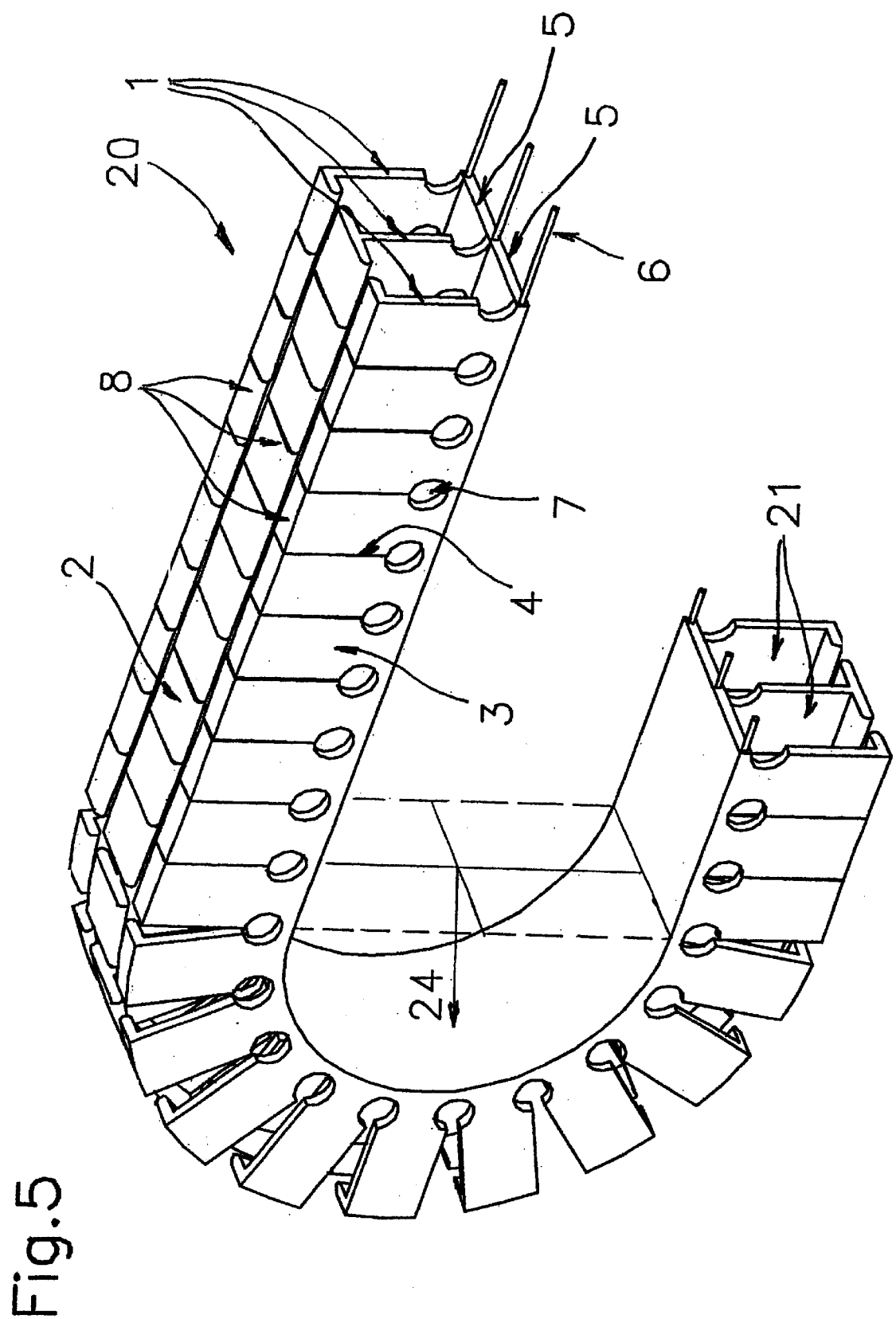
FIG. 5 is a perspective view of an embodiment of a line guide arrangement.

FIG. 5 illustrates a line guide arrangement 20 of plastic, which comprises a strand 1 with flexibly joined segments 2. The strand 1 comprises two channels 21, which extend substantially parallel to each other. The segments 2 are separated from one another by transverse separations 4 as well as cutouts 7.

The support wall portion 5 of line guide arrangement 20 comprises three reinforcement fibers 6, with each reinforcement fiber 6 being additionally arranged in a plane through the side wall portion 3 of a strand 1. A thus-constructed line guide arrangement 20 distinguishes itself by especially small bending radii 24. The guide channels 21 serve, for example, to receive different energy and supply lines. The arrangement of three reinforcement fibers 6 in the support wall portion 5 ensures a clearly improved alternating bending strength of the line guide arrangement, even with small bending radii 24 and a relatively high weight of the lines being guided.

Figure 6:
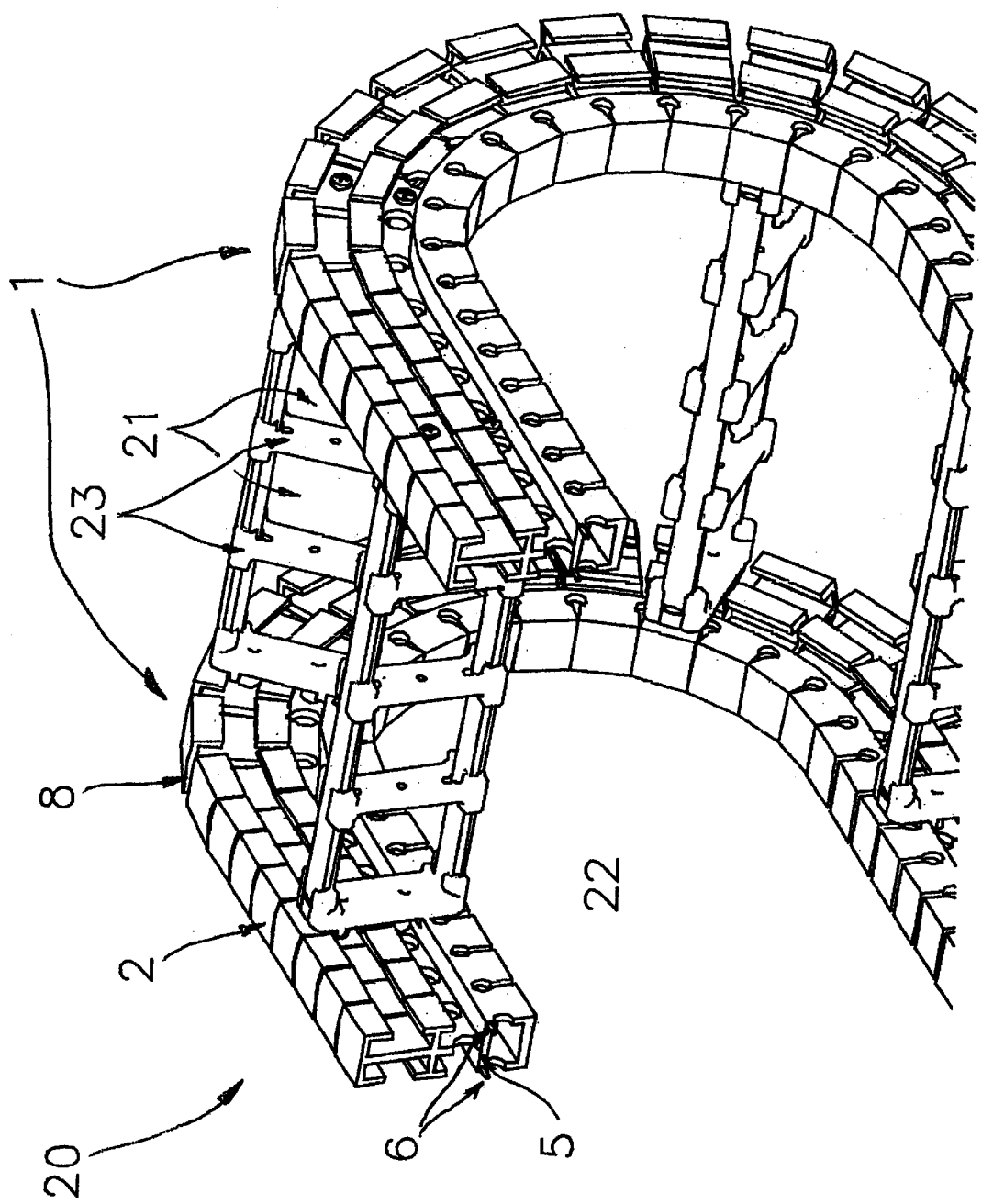
FIG. 6 is a perspective view of a further embodiment of a line guide arrangement.

FIG. 6 illustrates a further embodiment of a line guide arrangement 20. The strands 1 are spaced from each other by transverse struts 22. Opposite segments 2 of strands 1 are interconnected by two transverse struts 22 such that one transverse strut 22 is arranged close to the cover wall portion 8 and a further transverse strut 22 close to the support wall portion 5. The arrangement of the transverse struts 22 in the direction of the strand is freely selectable. Two transverse struts 22 as well as two opposite segments 2, which mount transverse struts 22, form a channel 21. The channel 21 may be subdivided by means of dividers 23, which are arranged and mounted at one's free discretion between two transverse struts 22 of two opposite segments 2. The guide channels 21 serve to receive energy and/or supply lines.

In their illustrated form, the two strands comprise each a support wall portion 5, which contains two reinforcement fibers 6. As described above, the reinforcement fibers 6 increase the alternating bending strength of strand 1. This leads likewise to an increased alternating bending strength of the line guide arrangement 20.

NOMENCLATURE

1 Strand
2 Segment
3 Side wall portion
4 Transverse separation
5 Support wall portion
6 Reinforcement fiber
7 Cutout
8 Cover wall portion
9 Bottom wall portion
10 Side wall
11 Cutout
12 Enlargement
13 Groove
14 Connection bore
15 Connection bore
16 Groove
17 Fastening means
18 Upper plate
19 Lower plate
20 Line guide arrangement
21 Guide channel
22 Transverse strut, cross member
23 Divider
24 Bending radius

What is claimed is:

1. A strand of plastic for a line guide arrangement the strand comprising:
   (a) a support wall portion along a longitudinal direction of the strand;
   (b) a plurality of flexibly joined segments extending from the support wall portion, each segment including at least one sidewall portion, and
   (c) at least one reinforcement fiber extending over at least a part of the length of the strand so as to be arranged substantially:
      (i) in the support wall portion,
      (ii) parallel to the longitudinal direction of the strand, and
      (iii) substantially in a neutral axis of the strand.

2. The strand of claim 1, wherein the at least one reinforcement fiber extends at least over the entire length of the strand.

3. The strand of claim 2, wherein the at least one reinforcement fiber projects beyond the strand.

4. The strand of claim 1 wherein the at least one reinforcement fiber extends on the support wall portion.

5. The strand of claim 1 wherein the at least one reinforcement fiber is attached, at least, in part to the support wall portion.

6. The strand of claim 1 wherein the at least one reinforcement fiber is at least partially surrounded by the material of the support wall portion.

7. The strand of claim 1 wherein the at least one reinforcement fiber possesses a higher alternating bending strength and/or tensile strength than the support wall portion.

8. The strand of claim 7, wherein the at least one reinforcement fiber consists of a steel wire.

9. The strand of claim 1 wherein the at least one reinforcement fiber is a plurality of reinforcement fibers arranged substantially in symmetry to the side wall portion of each of the plurality of flexibly joined segments.

10. A line guide arrangement comprising:
    (a) at least two substantially parallel strands, at least one strand being the at least one strand of claim 1; and
    (b) a plurality of cross members attached at preselected distances along the at least two substantially parallel strands so as to spatially separate the at least two substantially parallel strands and define a guide channel for running at least one line.

11. A method of making a strand of plastic for a line guide arrangement, comprising the steps of:
    (a) extruding a cross-section having portions suitable for a support wall portion of the strand and a sidewall portion of a segment;
    (b) forming a plurality of flexibly joined segments along the extrusion direction of the cross-section each segment including at least one side wall portion; and
    (c) providing at least one reinforcement fiber substantially in the support wall portion so as to be substantially parallel to the longitudinal direction of the strand and in a neutral axis of the strand.

12. The method of claim 11, wherein the providing of the at least one reinforcement fiber substantially on the support wall portion includes forming a longitudinal groove in the support wall portion and inserting the reinforcement fiber into the longitudinal groove.

13. A method of making a strand of plastic for a line guide arrangement, comprising the steps of:
    (a) inserting at least one reinforcement fiber into an extrusion die;
    (b) extruding a cross-section having portions suitable for a support wall portion of the strand and a sidewall portion of a segment; and
    (c) forming a plurality of flexibly joined segments along the extrusion direction of the cross-section, each segment including at least one side wall portion, wherein the at least one reinforcement fiber is arranged in the support wall portion so as to be substantially in a neutral axis of the strand.

14. A method of making a strand of plastic for a line guide arrangement, comprising the steps of:

(a) co-extruding
   (i) a cross-section having portions suitable for a support wall portion for the strand and a sidewall portion of a segment and
   (ii) at least one reinforcement fiber; and
(b) forming a plurality of flexibly joined segments along the extrusion direction of the cross-section including the co-extruded reinforcement fiber, each segment including at least one side wall portion, wherein the at least one reinforcement fiber is arranged substantially in the support wall portion so as to be substantially in a neutral axis of the strand.

* * * * *